(12) United States Patent
Walton et al.

(10) Patent No.: US 7,020,754 B1
(45) Date of Patent: Mar. 28, 2006

(54) METHOD AND SYSTEM FOR MAINTAINING DATA INTEGRITY USING DUAL WRITE OPERATIONS

(75) Inventors: John K. Walton, Mendon, MA (US); Kendell A. Chilton, Southboro, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/022,080

(22) Filed: Dec. 13, 2001

(51) Int. Cl.
*G06F 12/00* (2006.01)

(52) U.S. Cl. ............ 711/162; 711/112; 711/114; 711/130; 711/151; 711/156; 711/167

(58) Field of Classification Search ............ 711/162, 711/156, 167, 112, 114, 130, 151
See application file for complete search history.

(56) References Cited

U.S. PATENT DOCUMENTS

| | | | | |
|---|---|---|---|---|
| 4,654,819 A | * | 3/1987 | Stiffler et al. | 711/162 |
| 4,819,154 A | * | 4/1989 | Stiffler et al. | 714/20 |
| 5,835,955 A | * | 11/1998 | Dornier et al. | 711/162 |
| 5,844,776 A | * | 12/1998 | Yamaguchi et al. | 361/684 |
| 5,884,055 A | * | 3/1999 | Tung et al. | 710/307 |
| 5,890,207 A | * | 3/1999 | Sne et al. | 711/113 |
| 5,890,219 A | * | 3/1999 | Scaringella et al. | 711/162 |

* cited by examiner

*Primary Examiner*—Matthew Kim
*Assistant Examiner*—Stephen Elmore
(74) *Attorney, Agent, or Firm*—Scott A. Ouellette; Krishnendu Gupta; John M. Gunther

(57) ABSTRACT

In one embodiment, a data storage system is provided may include an input/output (I/O) controller, and first and second memory boards. The controller may receive data and a request to store the data in the system, and may include memory for initially storing the data. The first memory board may store, in response to a first memory storage request, a first copy of the data initially stored in the controller. The first memory board may provide to the controller a first status indication indicating whether the first memory board successfully stored the first copy. The second memory board may store, in response to receipt of a second memory storage request, a second copy of the data. The controller may provide a second status indication, indicating whether the request to store the data in the system was successful.

10 Claims, 4 Drawing Sheets

METHOD AND SYSTEM FOR MAINTAINING DATA INTEGRITY USING DUAL WRITE OPERATIONS

FIELD OF THE INVENTION

The present invention relates to a system (and method of using same) wherein fault tolerant memory operations may be performed.

BACKGROUND OF THE INVENTION

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the tradename Symmetrix™ (hereinafter referred to as the "Assignee's conventional storage system"), includes a plurality of disk mass storage devices configured as one or more redundant arrays of independent (or inexpensive) disks (RAID). The disk devices are controlled by disk controllers (commonly referred to as "back-end" controllers/directors) that store user data in, and retrieve user data from a shared cache memory resource in the subsystem. A plurality of host controllers (commonly referred to as "front-end" controllers/directors) may also store user data in and retrieve user data from the shared cache memory resource. The disk controllers are coupled to respective disk adapters that, among other things, interface the disk controllers to the disk devices. Similarly, the host controllers are coupled to respective host channel adapters that, among other things, interface the host controllers via channel input/output (I/O) ports to the network communications channels (e.g., SCSI, Enterprise Systems Connection (ESCON), and/or Fibre Channel (FC) based communications channels) that couple the storage subsystem to computer nodes in the computer network external to the subsystem (commonly termed "host" computer nodes or "hosts").

In the Assignee's conventional storage system, the shared cache memory resource may comprise a plurality of memory circuit boards that may be coupled to an electrical backplane in the storage system. The cache memory resource is a semiconductor memory, as distinguished from the disk storage devices also comprised in the Assignee's conventional storage system, and each of the memory boards comprising the cache memory resource may be populated with, among other things, relatively high-speed synchronous dynamic random access memory (SDRAM) integrated circuit (IC) devices for storing the user data. The shared cache memory resource may be segmented into a multiplicity of cache memory regions. Each of the regions may, in turn, be segmented into a plurality of memory segments. Each memory board also includes one or more application specific integrated circuit (ASIC) chips that implement certain functionalities carried out by the board (e.g., certain control logic functions).

In order to provide a data secure system without the additional costs of fault tolerant memory units, it has been proposed to configure the data storage system to implement a conventional "dual write" scheme. According to this scheme, the memory boards in the cache memory resource are grouped into respective, mutually exclusive, redundant pairs of memory boards, and each time user data is to be written into the cache memory resource by a host controller (e.g., in response to a request issued from a host node to store the user data in the data storage system), the host controller concurrently generates and provides to both of the memory boards in a respective redundant pair of memory boards respective requests to perform respective memory write operations to write respective copies of the data into the two respective memory boards. After the memory boards successfully complete these respective memory operations, the memory boards provide to the host controller respective indications that the respective memory operations have been successfully completed, and after both of the memory boards have provided such indications to the host controller, the controller may indicate to the host node that requested the storage of the user data that such storage has been successfully completed by the data storage system. Thereafter, background processes in the data storage system may attend to the task of de-staging the user data (presently stored in the cache memory resource) into one or more of the disk mass storage devices in the data storage system, and the host node may begin or resume other/additional processing activities (e.g., processing activities that may sequentially follow the data storage operation that was just performed) that the host node had deferred or postponed pending receipt by the host node from the host controller of the indication that the requested storage of the user data has been successfully completed.

In this conventional dual write scheme, if one of the two memory boards in the respective redundant pair of memory boards is busy (e.g., performing another memory operation) when it receives the memory write operation request from the host controller, it will not be able to begin immediately to execute the memory write operation requested by the host controller. This delays the completion of the requested memory operation by this one memory board, and therefore, also delays the provision of the indication, from the host controller to the host node, of the successful completion of the storage operation requested by the host node. Disadvantageously, this is wasteful of host node processing resources, since it increases the amount of time that the host node may delay undertaking or continuing processing activities that are not involved with the data storage operation requested by the host node. Accordingly, it would be desirable to provide a technique for carrying out a mirrored memory operation in a data storage system, wherein this type of delay in the completion of a requested memory write operation by a single memory board in a redundant pair of memory boards may not increase the amount of time that the host node must defer from undertaking or continuing the aforesaid types of other/additional processing activities, and also wherein a high degree of data security and fault tolerance may be maintained.

SUMMARY OF THE INVENTION

The present invention provides a data storage system and method of using same that are able to overcome the aforesaid and other disadvantages and drawbacks of the prior art. In one embodiment of the present invention, the data storage system may be used to execute a memory operation, and comprises an input/output (I/O) controller that may receive, from a data exchanging device (e.g., a host node) external to the system, user data and a request to store the user data in the system. The controller may include integrated, fault secure buffer memory that may be used to initially store the user data in the controller when the controller receives the user data from the data exchanging device.

The system of this embodiment may also include a shared, fault secure semiconductor cache memory resource. The shared cache memory resource may include a first memory board and a second memory board. The first memory board may store, in response to a first memory storage request provided by the controller, a first copy of the data initially stored in the buffer memory in the controller. The first memory board may be configured to provide to the controller a first status indication that may indicate whether the first memory board successfully stored the first copy. The second memory board may store, in response to receipt by the second memory board of a second memory storage request from the controller, a second copy of the data initially stored in the controller. The second memory board may be configured to provide to the controller a second status indication that may indicate whether the second memory board successfully stored the second copy. The controller may be configured to provide to the data exchanging device a third status indication. The third status indication may be provided to the data exchanging device after the controller receives either the first status indication or the second status indication (i.e., after the faster of the first and second memory boards completes its respective write operation). The third status indication may indicate whether the system successfully stored the data in the system.

The controller may also be configured to provide the first memory storage request concurrently with receipt by the controller of the data and the request to store the data in the system. The controller may also provide concurrently the first memory storage request and the second memory storage request; alternatively, the controller may provide the first memory storage request prior to providing the second memory storage request, and the first memory board may be selected by the controller based, at least in part, upon whether the first memory board is presently involved in another memory operation (i.e., in order to ensure that, when selected by the controller, the first memory board is not presently involved with another memory operation when the controller provides to the first memory board the first memory storage request).

In summary, in a data storage system made according to this embodiment of the present invention, a host node may forward to a host I/O controller in the data storage system data and a request to store the data in the system. In response, the controller initially may store the data in buffer memory internal to the controller, and may generate and provide to a redundant pair of cache memory boards respective requests to write respective copies of the data into the memory boards. When either one of the two memory boards (i.e., the faster of the two memory board to complete its respective memory write operation, e.g., the first memory board) comprised in this pair of memory boards successfully writes a copy of the data into itself, that memory board may indicate this to the controller, and in response, the controller may indicate to the host node that the data storage system has completed successfully the data storage operation requested by the host node. After the controller receives from the other memory board in the redundant pair of memory boards an indication that it has successfully written a copy of the data into itself, the controller may permit to be overwritten with other data the portion of controller's internal buffer memory presently storing the data from the host node. Thus, according to this embodiment of the present invention, (1) prior to indicating to the host node that the data storage system has completed successfully the data storage operation requested by the host node, the data storage system ensures that two copies of the data from the host node are stored in the system (i.e., one copy in the controller's buffer memory and another copy in one of the two memory boards in the redundant pair of memory boards), (2) only after the controller receives from both of these memory boards respective indications that both of these memory boards have written respective copies of the data into themselves is the copy of the data stored in the controller's buffer memory permitted to be overwritten, and (3) after either one of the two memory boards in the redundant pair of memory boards has written into itself a respective copy of the data, the controller may indicate to the host node that the data storage system has completed successfully the host node's requested data storage operation. Advantageously, in contradistinction to the aforesaid prior art, these features of this embodiment of the present invention permit a data storage system made in accordance with this embodiment of the present invention to be able to perform operations on a fault secure, mirrored memory that may exhibit a high degree of data security and also wherein the aforesaid type of delay in the completion of a requested memory write operation by a single memory board in a redundant pair of memory boards may not increase the amount of time that the host node may delay undertaking or continuing the aforesaid types of other/additional processing activities.

These and other features and advantages of the present invention, and various embodiments thereof, will become apparent as the following Detailed Description proceeds and upon reference to the Figures of the drawings, wherein like numerals depict like parts, and in which:

Although the following Detailed Description will proceed with reference being made to illustrative embodiments and methods of use of the present invention, it should be understood that it is not intended that the present invention be limited to these illustrative embodiments and methods of use. On the contrary, many alternatives, modifications, and equivalents of these illustrative embodiments and methods of use will be apparent to those skilled in the art. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
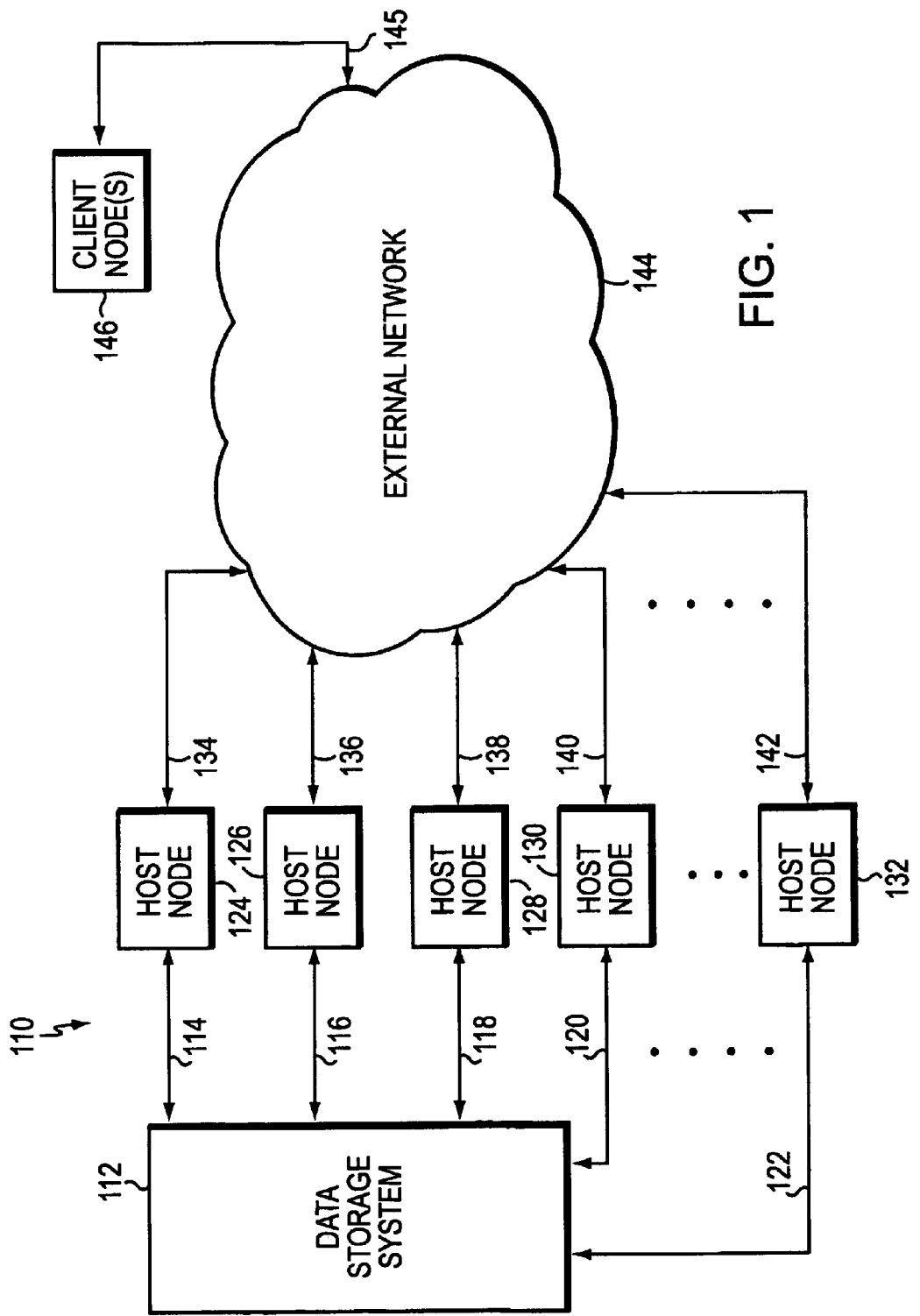
FIG. 1 is a high-level schematic block diagram of a data storage network that includes a data storage system wherein one embodiment of the present invention may be practiced to advantage.

Turning now to FIGS. 1–4, illustrative embodiments of the present invention will be described. FIG. 1 is a high-level block diagram illustrating a data storage network 110 that includes a data storage system 112 wherein one embodiment of the subject invention may be practiced to advantage. System 112 is coupled via communication links 114, 116, 118, 120, . . . 122 to respective host computer nodes 124, 126, 128, 130, . . . 132. Each of the communication links 114, 116, 118, 120, . . . 122 may be configured for communications involving a respective conventional network communication protocol (e.g., FC, ESCON, SCSI, Fibre Connectivity, Gigabit Ethernet, etc.). Host nodes 124, 126, 128, 130, . . . 132 are also coupled via additional respective conventional network communication links 134, 136, 138, 140, . . . 142 to an external network 144. Network 144 may comprise one or more Transmission Control Protocol/ Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138, 140, . . . 142, and 145 are selected so as to ensure that the nodes 124, 126, 128, 130, . . . 132 may exchange data and commands with the nodes 146 via network 144.

Host nodes 124, 126, 128, 130, . . . 132 may be any one of several well-known types of computer nodes, such as server computers, workstations, or mainframes. In general, each of the host nodes 124, 126, 128, 130, . . . 132 and client nodes 146 comprises a respective computer-readable memory (not shown) for storing software programs and data structures associated with, and for carrying out the functions and operations described herein as being carried by these nodes 124, 126, 128, 130, . . . 132, and 146. In addition, each of the nodes 124, 126, 128, 130, . . . 132, and 146 further includes one or more respective processors (not shown) and network communication devices for executing these software programs, manipulating these data structures, and for permitting and facilitating exchange of data and commands among the host nodes 124, 126, 128, 130, . . . 132 and client nodes 146 via the communication links 134, 136, 138, 140, . . . 142, network 144, and links 145. The execution of the software programs by the processors and network communication devices included in the hosts 124, 126, 128, 130, . . . 132 also permits and facilitates exchange of data and commands among the nodes 124, 126, 128, 130, . . . 132 and the system 112 via the communication links 114, 116, 118, 120, . . . 122, in the manner that will be described below.

Figure 2:
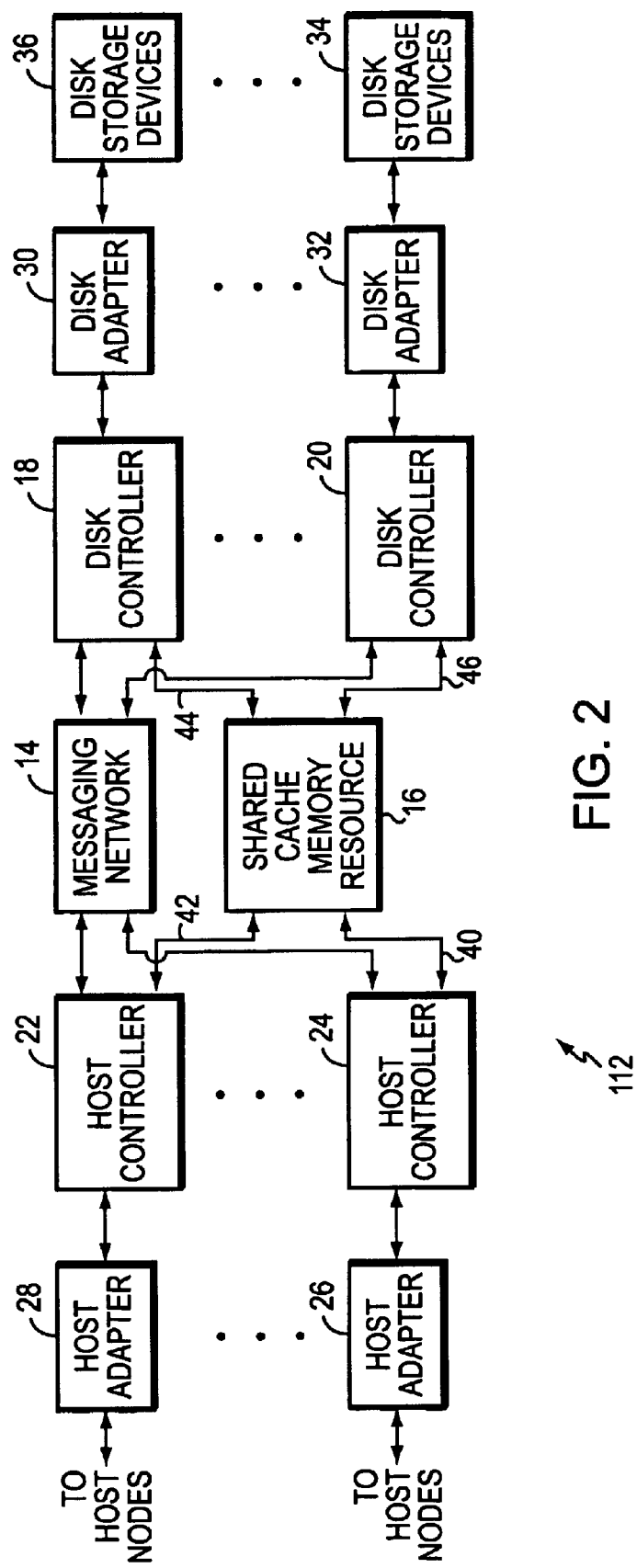
FIG. 2 is a high-level schematic block diagram illustrating functional components of the data storage system included in the data storage network shown in FIG. 1.

FIG. 2 is a high-level schematic block diagram of functional components of the system 112. System 112 includes a plurality of host adapters 26 . . . 28, a plurality of host controllers 22 . . . 24, a message network or system 14, a shared cache memory resource 16, a plurality of disk controllers 18 . . . 20, a plurality of disk adapters 30 . . . 32, and sets of disk storage devices 34 . . . 36. In system 112, the host controllers and disk controllers are coupled to individual memory boards (see FIG. 3) comprised in the cache memory 16 via a point-to-point data transfer network system that comprises a plurality of network links. For example, host controllers 22 and 24 are coupled to the cache memory resource 16 via respective pluralities of point-to-point data transfer network links 42 and 40 comprised in the point-to-point data transfer network system. Similarly, the disk controllers 18 and 20 are coupled to the cache memory resource 16 via respective pluralities of point-to-point data transfer network links 44 and 46 comprised in the point-to-point data transfer network system.

In this embodiment of system 112, although not shown explicitly in the Figures, depending upon the particular communication protocols being used in the respective links 114, 116, 118, 120, . . . 122, each host adapter 26 ... 28 may be coupled to multiple respective host nodes. For example, in this embodiment of system 112, if the links 114, 116, 118, 120 are FC communication links, adapter 26 may be coupled to host nodes 124, 126, 128, 130 via links 114, 116, 118, 120, respectively. It should be appreciated that the number of host nodes to which each host adapter 26 . . . 28 may be coupled may vary, depending upon the particular configurations of the host adapters 26 . . . 28, and host controllers 22 . . . 24, without departing from this embodiment of the present invention. In network 110, host adapter 26 provides network communication interfaces via which the host controller 24 may exchange data and commands, via the links 114, 116, 118, 120, with the host nodes 124, 126, 128, 130, respectively.

Each host controller 22 . . . 24 may comprise a single respective circuit board or panel. Likewise, each disk controller 18 . . . 20 may comprise a single respective circuit board or panel. Each disk adapter 30 . . . 32 may comprise a single respective circuit board or panel. Likewise, each host adapter 26 . . . 28 may comprise a single respective circuit board or panel. Each host controller 22 . . . 24 may be electrically and mechanically coupled to a respective host adapter 28 . . . 26, respectively, via a respective mating electromechanical coupling system.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34, 36 may be configured as redundant arrays of magnetic and/or optical disk mass storage devices.

It should be appreciated that the respective numbers of the respective functional components of system 112 shown in FIG. 2 are merely for illustrative purposes, and depending upon the particular application to which the system 112 is intended to be put, may vary without departing from the present invention. It may be desirable, however, to permit the system 112 to be capable of failover fault tolerance in the event of failure of a particular component in the system 112. Thus, in practical implementation of the system 112, it may be desirable that the system 112 include redundant functional components and a conventional mechanism for ensuring that the failure of any given functional component is detected and the operations of any failed functional component are assumed by a respective redundant functional component of the same type as the failed component.

The general manner in which data may be retrieved from and stored in the system 112 will now be described (referring again to FIG. 1). Broadly speaking, in operation of network 110, a client node 146 may forward a request to retrieve data to a host node (e.g., node 124) via one of the links 145 associated with the client node 146, network 144 and the link 134 associated with the host node 124. If data being requested is not stored locally at the host node 124, but instead, is stored in the data storage system 112, the host node 124 may request the forwarding of that data from the system 112 via the FC link 114 associated with the node 124.

The request forwarded via link 114 is initially received by the host adapter 26 (see FIG. 2) coupled to that link 114. The host adapter 26 associated with link 114 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may forward a message, via the messaging network 14, to the disk controller (e.g., controller 18) associated with the storage devices 36 within which the requested data is stored, requesting that the disk controller 18 retrieve the requested data into the cache 16.

In response to the message forwarded from the host controller 24, the disk controller 18 may forward via the disk adapter 30 to which it is coupled appropriate commands for causing one or more of the disk devices 36 to retrieve the requested data. In response to such commands, the devices 36 may forward the requested data to the disk controller 18 via the disk adapter 30, and the disk controller 18 may transfer via links 44 the requested data for storage in the cache 16. The disk controller 18 may then forward via the network 14 a message advising the host controller 24 that the requested data has been stored in the cache 16.

In response to the message forwarded from the disk controller 18 via the network 14, the host controller 24 may retrieve the requested data from the cache 16 via links 40, and may forward it to the host node 124 via the adapter 26 and link 114. The host node 124 may then forward the requested data to the client node 146 that requested it via the link 134, network 144 and the link 145 associated with the client node 146.

Additionally, a client node 146 may forward a request to store data to a host node (e.g., node 124) via one of the links 145 associated with the client node 146, network 144 and the link 134 associated with the host node 124. The host node 124 may store the data locally, or alternatively, may request the storing of that data in the system 112 via the link 114 associated with the node 124.

The data storage request forwarded via link 114 is initially received by the host adapter 26 coupled to that link 114. The host adapter 26 associated with link 114 may then forward the data storage request to the host controller 24 to which it is coupled. In response to the data storage request forwarded to it, the host controller 24 may then initially transfer, via the links 40, the data associated with the request for storage in cache 16. Thereafter, one of the disk controllers (e.g., controller 18) may cause that data stored in the cache 16 to be stored in one or more of the data storage devices 36 by issuing appropriate commands for same to the devices 36 via the adapter 30.

Figure 3:
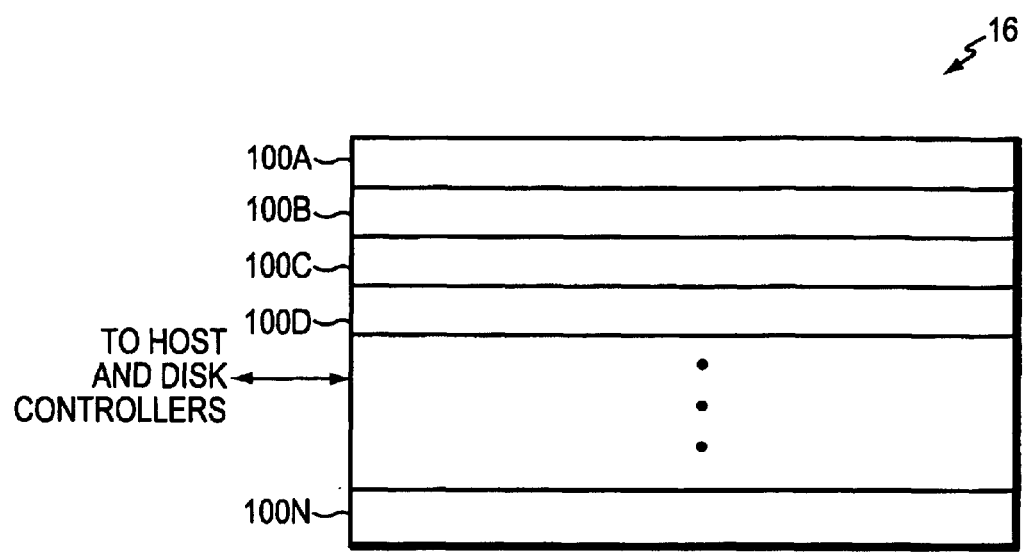
FIG. 3 is a high-level schematic block diagram illustrating functional components of the shared cache memory resource in the data storage system of FIG. 2.

As is shown in FIG. 3, cache memory system 16 comprises a plurality of electrical circuit boards or cards 100A, 100B, 100C, 100D . . . 100N that may be coupled to an electrical backplane (not shown) in system 112. When coupled to this backplane, the memory boards 100A, 100B, 100C, 100D . . . 100N may become electrically connected via electrical circuit traces in the backplane to other components of system 112, such that the boards 100A, 100B, 100C, 100D . . . 100N may communicate and interact with each other and the host and disk controllers in system 112 in the manner described herein. It is important to note that the number of memory boards shown in FIG. 3 is merely illustrative, and depending upon the configuration of the system 112, the actual number of memory boards that may be comprised in the system 112 may vary. The construction and operation of each of the memory boards 100A, 100B, 100C, 100D . . . 100N are essentially identical.

In accordance with this embodiment of the present invention, the memory boards 100A, 100B, 100C, 100D, . . . 100N comprised in the cache 16 may be assigned to respective predetermined groups of redundant pairs of memory boards, with no one respective memory board in cache 16 being assigned to more than one respective redundant pair of memory boards. Thus, for example, memory boards 100A and 100B may be assigned to one such respective redundant pair of memory boards in cache 16, memory boards 100C and 100D may be assigned to another such respective redundant pair of memory boards in cache 16, and so forth, until all of the memory boards comprised in the cache 16 have been grouped into such redundant pairs of memory boards.

Although not shown in the Figures, it should be understood that each of the memory boards may comprise respective control and network-related circuitry, and a plurality (e.g., four) of memory regions. Each of the memory regions may comprise a respective plurality of banks of SDRAM IC devices. Each of the respective pluralities of SDRAM IC devices comprised in each of these banks may be configured so as to comprise respective pluralities of memory segments of predetermined size (e.g., 256 megabytes each) in memory system 16. It should be noted that the respective numbers of memory regions comprised in the memory boards in cache 16, as well as, the numbers and sizes of the memory segments comprised in such regions may vary without departing from this embodiment of the present invention.

In each respective memory segment, the data stored therein may be further segmented into respective pluralities of data words of predetermined size. Individual data words may be grouped into stripe units of predetermined size, and the stripe units may be striped across the respective memory regions in each respective memory board.

It should be appreciated that each of the SDRAM IC devices comprised in the cache 16 is a semiconductor memory device, and these SDRAM IC devices may be used by the cache 16 to store user data forwarded to the cache 16 from the host controllers and the disk controllers in system 112. Accordingly, the cache memory system 16 is a semiconductor memory system, as distinguished from the disk storage devices 34 . . . 36 comprised in the system 112, and the memory regions and memory segments comprised in the memory system 16 are semiconductor memory regions and semiconductor memory segments, respectively.

In general, the respective control and network-related circuitry comprised in a respective memory board in cache 16 may comprise respective logic network and control logic circuitry (not shown) that may facilitate, among other things, exchange of data and commands among the memory regions in the respective memory board and the host controllers and disk controllers (e.g., via the links 40, 42, 44, and 46).

Although not shown in Figures, it should be noted that, in actual implementation portions of the respective control and network-related circuitry comprised in a respective memory board may be distributed in the memory regions (e.g., circuitry for providing relatively low level commands/signals to actual SDRAM IC devices in the region, such as, chip select, clock synchronization, memory addressing, data transfer, memory control/management, clock enable signals, etc.) comprised in the respective board. Further details and description of the types and functions of the portions of the respective control and network-related circuitry that may be distributed in the memory regions may be found in e.g., commonly-owned, co-pending U.S. patent application Ser. No. 09/796,259, filed Feb. 28, 2001, entitled "Error Condition Handling"; said co-pending Application is hereby incorporated herein by reference in its entirety. Portions of the respective control and network-related circuitry of the respective memory boards 100A, 100B, 100C, 100D . . . 100N may be embodied as application specific integrated circuits (and related circuitry) that may be preprogrammed with specific algorithms whose execution may permit the respective control and network circuitry to be able to carry out the procedures, processes, techniques, operations, and functions that are described above as being carried by such control and network circuitry.

Figure 4:
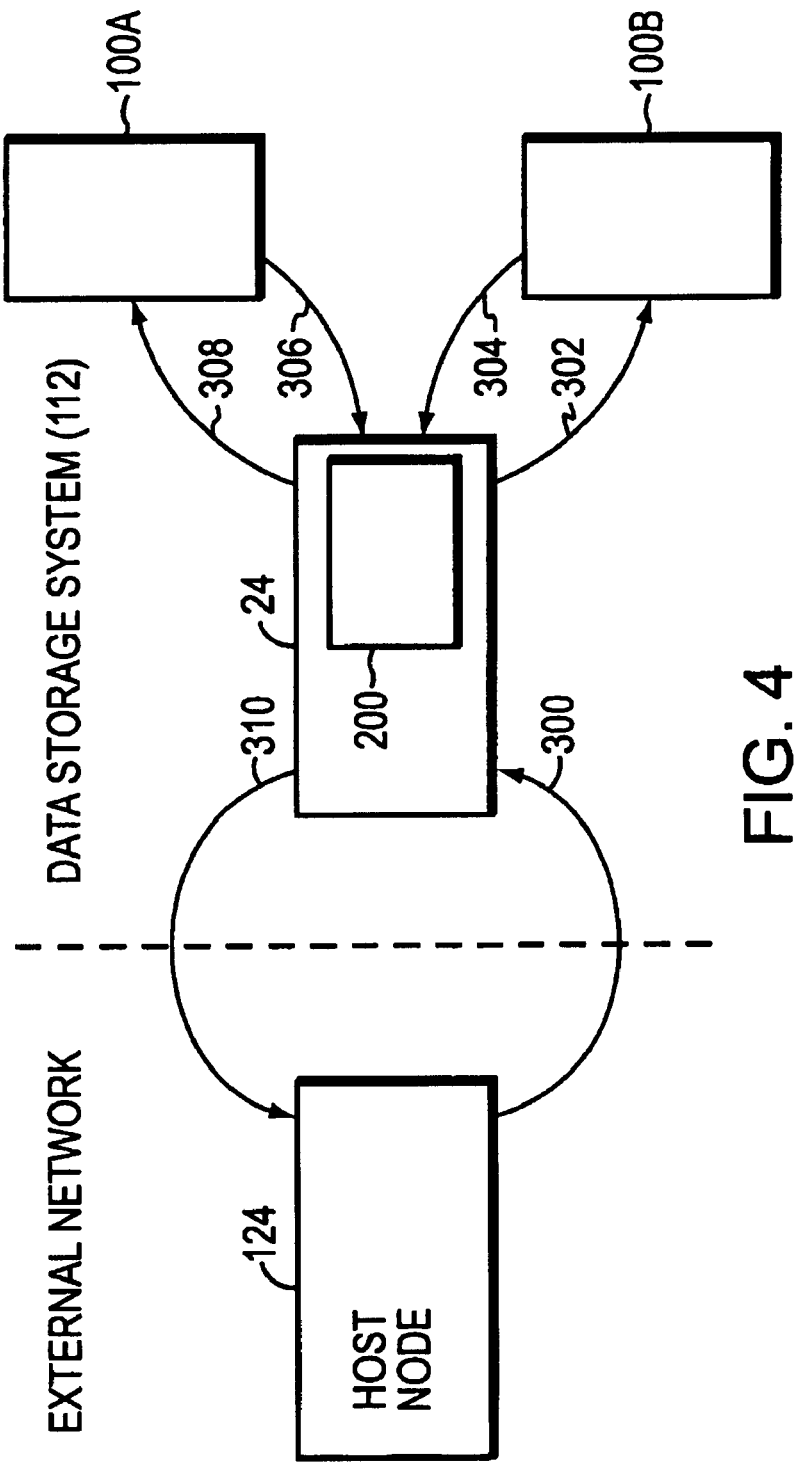
FIG. 4 is a high-level schematic block diagram for use in describing an embodiment of the present invention that may be practiced to advantage in the data storage system of FIG. 2.

FIG. 4 is a highly schematic diagram for use in illustrating the manner in which dual write cache memory write operations, in accordance with this embodiment of the present invention, may be implemented in the system 112. In accordance with this embodiment of the present invention, a memory write operation may be initiated by one of the host nodes (e.g., host node 124). coupled to the data storage system 112. More specifically, the host node 124 may initiate such a memory write operation by issuing to the system 112 a request to store data user in the system 112, together with the user data that the host node 124 requests to be stored in the system 112, which request and data are collectively referred to hereinafter by the term "the host node's data storage request" and are referred to by the numeral 300 in FIG. 4. The host node's data storage request 300 is initially received by the adapter (e.g., adapter 26) to which the host node 124 issuing the host node's data storage request 300 is coupled, which adapter 26 may then transmit the host node's data storage request 300 to the host controller (e.g., controller 24) to which the adapter 26 is coupled.

When the controller 24 receives the host node's data storage request 300, the controller 24 may initially store in a buffer memory 200 comprised controller 24 the data in the host node's data storage request 300 that is to be stored in the system 112, and the controller 24 also may generate and provide to a first memory board (e.g., memory board 100B) in one respective redundant pair of memory boards in cache memory 16 a request 302 that this first memory board 100B perform a memory write operation to write into the first memory board 100B the data that was requested in the host node's data storage request 300 to be stored in the system 112. Contemporaneously with the generation and provision by the controller 24 to the first memory board 100B of the request 302, the controller 24 may also generate and provide to the second memory board 100A comprised in the respective redundant pair of memory boards that includes the first memory board 100B a request 308 that the second memory board 100A perform a respective memory write operation to write into the second memory board 100A the data that was requested in the host node's data storage request 300 to be stored in the system 112.

When the first memory board 100B receives the request 302, the first memory board 100B may write into itself a respective copy of the data that was requested in the host node's data storage request 300 to be stored in the system 112; after the first memory board 100B successfully completes this memory write operation, and thus, successfully writes into itself said copy of the data, the first memory board 100B may generate and provide to the controller 24 a status indication message 304 that may indicate that said operation was successfully completed by the first memory board 100B. Similarly, when the second memory board 100A receives the request 308, the second memory board 100A may write into itself a respective copy of the data that was requested in the host node's data storage request 300 to be stored in the system 112; after the second memory board 100A successfully completes this memory write operation, and thus, successfully writes into itself said copy of the data, the second memory board 100A may generate and provide to the controller 24 a status indication message 306 that may indicate that said operation was successfully completed by the second memory board 100A. After the controller 24 receives either of the messages 304, 306, the controller 24 then may generate and provide to the host node 124 (via the adapter 26 and the link 114) a respective status indication message 310 that may indicate that the host node's data storage request 300 has been successfully completed by the system 112. After the host node 124 receives the message 310 from the controller 24, the host node 124 may begin or resume other/additional processing activities (e.g., processing activities that may sequentially follow the data storage operation requested by the request 300) and the controller 24 may permit the data from the host node 124 that is stored in the buffer memory 200 to be overwritten as necessary to permit additional processing activities to be carried out by the controller 24.

Alternatively, the controller 24 may determine (using conventional techniques) whether either the first memory board 100B or the second memory board 100A in the given redundant pair of memory boards currently is not busy (e.g., currently is not handling or processing another memory operation), and if one (e.g., first memory board 100B). of these memory boards 100A, 100B is not busy, the controller 24 may select that memory board 100B to receive its respective request (e.g., request 302) first; that is, for example, if the controller 24 determines that the first memory board 100B is not busy, the controller 24 may generate and provide to the first memory board 100B the request 302, prior to generating and providing the request 308 to the second memory board 100A.

In accordance with this alternative, when the first memory board 100B receives the request 302, the first memory board 100B may write into itself a copy of the data that was requested in the host node's data storage request 300 to be stored in the system 112; after the first memory board 100B successfully completes this memory write operation, and thus, successfully writes into itself said copy of the data, the first memory board 100B may generate and provide to the controller 24 a status indication message 304 that may indicate that said operation was successfully completed by the first memory board 100B. In accordance with this alternative, after the controller 24 receives this message 304 from the first memory board 100B, the controller 24 then may generate and provide to the second memory board 100A the request 308, and concurrently therewith, the controller 24 may generate and provide to the host node 124 (via the adapter 26 and the link 114) a respective status indication message 310 that may indicate that the host node's data storage request 300 has been successfully completed by the system 112. After the host node 124 receives the message 310 from the controller 24, the host node 124 may begin or resume the aforesaid types of other/additional processing activities, and the controller 24 may permit the data from the host node 124 that is stored in the buffer memory 200 to be overwritten as necessary to permit additional processing activities to be carried out by the controller 24.

Thus, it is evident that there has been provided, in accordance with the present invention, a technique that may be used to carry out memory operations that fully satisfy the aims and objectives, and achieve the advantages, hereinbefore set forth. The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed.

For example, although illustrative embodiments of the present invention have been described in connection with use in a network data storage system that comprises a messaging network 14 that facilitates communications between the host controllers and the disk controllers, and a point-to-point data transfer network system that comprises links 40, 42, 44, and 46, if appropriately modified, these embodiments of the present invention may instead be practiced in connection with other types of network data storage systems, e.g., that utilize a redundant bus system of the type described in commonly-owned, co-pending U.S. patent application Ser. No. 09/796,259, filed Feb. 28, 2001, entitled "Error Condition Handling".

Other modifications are also possible. For example, although the present invention has been described only in connection with the performance of cache memory write operations using host controllers, if appropriately modified, the disk controllers in the system 112 may be used in implementing write operations to the cache 16 in accordance with the principles of the present invention.

Additional modifications are also possible. For example, although in the above-described dual write memory operation scheme that may be employed in system 112, each of the memory boards in the cache memory 16 may be associated with another respective memory board in the cache memory 16 (i.e., in a one-to-one paired relationship), and a complete copy of all of the data stored in a given memory board in the cache memory 16 may be replicated in another respective memory board paired therewith in the cache memory 16, if appropriately modified, the system 112 instead may implement a more flexible type of dual write scheme. According to this modified dual write scheme, a host controller (e.g., host controller 24) may select, on a case-by-case basis, using a predetermined algorithm, the locations in the memory system 16 in which to replicate data stored in other locations in the memory system 16, and it may be possible that, in at least certain situations, not all of the data in a given memory board in the cache 16 may be replicated in another memory board in the cache 16. For example, it may not be necessary, in order to maintain fault tolerance, to replicate in a memory board in the cache 16 data stored in a disk device; therefore, to avoid unnecessary processing overhead, etc., a host controller 24 may be configured to replicate data (e.g., among different memory boards in the cache 16) only if that data is not securely retrievable elsewhere in the system 112.

Furthermore, although the buffer memory 200 has been described herein as comprising only a single buffer memory, if the host controller 24 is appropriately modified, the buffer memory 200 instead may comprise multiple buffer memories that together may provide the functionality described herein as being performed by the buffer memory 200. Additionally, although in the dual write scheme previously described herein as being performed in the system 112, a memory write operation involving the storing of user data in the buffer memory 200 may be completed prior to issuance by the controller 24 of any memory write operation requests to memory boards in the cache memory 16 (i.e., to cause that data to written into the cache 16), if appropriately modified, such memory write operation requests instead may be issued prior to the completion of such a memory write operation by the buffer memory 200. Also, although the above embodiments of the present invention have described in connection with use in a network data storage system, it should be appreciated that, if appropriately modified, the inventive concepts of the present invention may be employed to advantage in other systems (e.g., systems in which data security may be maintained by using data replication techniques).

Yet other modifications are also possible. Accordingly, the present invention should be viewed broadly as encompassing all modifications, variations, alternatives and equivalents as may be encompassed by the hereinafter appended claims.

What is claimed is:

1. System that may be used to execute a memory operation, the system comprising:
an input/output (I/O) controller that may receive, from a data exchanging device external to the system, data and a request to store the data in the system, the controller including memory for initially storing the data in the controller when the controller receives the data from the data exchanging device;
a first memory board that may store, in response to a first memory storage request provided by the controller, a first copy of the data initially stored in the controller, the first memory board being configured to provide to the controller a first status indication that may indicate whether the first memory board successfully stored the first copy;
a second memory board that may store, in response to receipt by the second memory board of a second memory storage request from the controller, a second copy of the data initially stored in the controller, the second memory board being configured to provide to the controller a second status indication that may indicate whether the second board successfully stored the second copy; and
the controller also being configured to provide to the data exchanging device a third status indication, the third status indication being provided to the data exchanging device prior to receipt by the controller of the second status indication, the third status indication indicating whether the system successfully stored the data in the system.

2. The system of claim 1, wherein the controller is configured to provide the first memory storage request concurrently with receipt by the controller of the data and the request to store the data in the system.

3. The system of claim 1, wherein the first memory storage request and the second memory storage request are provided concurrently by the controller.

4. The system of claim 1, wherein the controller provides the first memory storage request prior to providing the second memory storage request.

5. The system of claim 4, wherein the first memory board is selected by the controller based, at least in part, upon whether the first memory board is presently involved in another memory operation.

6. Method of using a system that may be used to execute a memory operation, the system including an I/O controller, a first memory board, and a second memory board, the method comprising:
receiving at the input/output (I/O) controller, from a data exchanging device external to the system, data and a request to store the data in the system, the controller including memory for initially storing the data in the controller when the controller receives the data from the data exchanging device;
storing in the first memory board, in response to a first memory storage request provided by the controller, a first copy of the data initially stored in the controller, the first memory board being configured to provide to the controller a first status indication that may indicate whether the first memory board successfully stored the first copy;
storing in the second memory board, in response to receipt by the second memory board of a second memory storage request from the controller, a second copy of the data initially stored in the controller, the second memory board being configured to provide to the controller a second status indication that may indicate whether the second memory board successfully stored the second copy; and
providing from the controller to the data exchanging device a third status indication, the third status indication being provided to the data exchanging device prior to the receipt by the controller of the second status indication, the third status indication indicating whether the system successfully stored the data in the system.

7. The method of claim 6, wherein the controller is configured to provide the first memory storage request concurrently with receipt by the controller of the data and the request to store the data in the system.

8. The method of claim 6, wherein the first memory storage request and the second memory storage request are provided concurrently by the controller.

9. The method of claim 6, wherein the controller provides the first memory storage request prior to providing the second memory storage request.

10. The method of claim 9, wherein the first memory board is selected by the controller based, at least in part, upon whether the first memory board is presently involved in another memory operation.

* * * * *